United States Patent
Imada

(10) Patent No.: US 8,704,881 B2
(45) Date of Patent: Apr. 22, 2014

(54) STEREOSCOPIC IMAGE DISPLAY APPARATUS

(75) Inventor: Katsumi Imada, Nara (JP)

(73) Assignee: Panasonic Corporation, Osaka (JP)

(*) Notice: Subject to any disclaimer, the term of this patent is extended or adjusted under 35 U.S.C. 154(b) by 484 days.

(21) Appl. No.: 13/059,065

(22) PCT Filed: May 28, 2010

(86) PCT No.: PCT/JP2010/003617
§ 371 (c)(1),
(2), (4) Date: Feb. 15, 2011

(87) PCT Pub. No.: WO2010/140332
PCT Pub. Date: Dec. 9, 2010

(65) Prior Publication Data
US 2011/0149050 A1 Jun. 23, 2011

(30) Foreign Application Priority Data
Jun. 1, 2009 (JP) .................... 2009-131735

(51) Int. Cl.
*H04N 13/04* (2006.01)
(52) U.S. Cl.
USPC .............................. 348/51; 348/46
(58) Field of Classification Search
USPC .................................................. 348/51, 46
See application file for complete search history.

(56) References Cited

U.S. PATENT DOCUMENTS

| 5,073,914 A * | 12/1991 | Asahina et al. ........... 378/42 |
| 2003/0174204 A1 | 9/2003 | Otani et al. |
| 2005/0134699 A1* | 6/2005 | Nagashima et al. ....... 348/218.1 |
| 2006/0245639 A1* | 11/2006 | Jiang et al. .............. 382/154 |

FOREIGN PATENT DOCUMENTS

| JP | 04-061494 A | 2/1992 |
| JP | 08-126034 A | 5/1996 |

(Continued)

OTHER PUBLICATIONS

Yano et al., Method and Device for Displaying Stereoscopic Image, English Translation of JP H08-126034, May 17, 1996.*

(Continued)

*Primary Examiner* — Christopher S Kelley
*Assistant Examiner* — Matthew Kwan
(74) *Attorney, Agent, or Firm* — Renner, Otto, Boisselle & Sklar, LLP

(57) ABSTRACT

A stereoscopic image display device according to the present invention includes: an image generating section 4, which uses first and second images, captured by two image capturing sections arranged at a first optical axis interval, to generate two images to be viewed from two viewing points that are spaced by a wider interval than the first optical axis interval; and a display section 10 for presenting the two images generated by the image generating section 4 to a user's left and right eyes, respectively. The generating section 4 includes: a coordinate transformation section for transforming, on a unit element basis, the coordinates of at least one of the first and second images captured so that the amount of parallax of the two images generated by the image generating section 4 becomes equal to the amount of parallax between the two viewing points; and an image interpolation section for generating, by interpolation, image information for some pixels that have lost their own image information as a result of the coordinate transformation.

15 Claims, 12 Drawing Sheets

(56) References Cited

FOREIGN PATENT DOCUMENTS

| JP | 11-146423 A | 5/1999 |
|----|-------------|--------|
| JP | 2004-200973 A | 7/2004 |
| JP | 2004-208255 A | 7/2004 |
| JP | 2004-221699 A | 8/2004 |
| WO | WO 9513564 A1 * | 5/1995 |

OTHER PUBLICATIONS

International Search Report for corresponding International Application No. PCT/JP2010/003617 mailed Aug. 31, 2010.

Form PCT/ISA/237 for International Application No. PCT/JP2010/003617 dated Aug. 31, 2010 and partial English translation.

* cited by examiner

AMOUNT OF PARALLAX ESTIMATE R(k)

k 1   NUMBER (k) OF PIXELS TO SHIFT BLOCK

STEREOSCOPIC IMAGE DISPLAY APPARATUS

TECHNICAL FIELD

The present invention relates to a three-dimensional image display device for presenting an image that looks three-dimensional image to the viewer's eyes.

BACKGROUND ART

A conventional three-dimensional image display device captures two images, which will be viewed by the viewer with his or her right and left eyes, using two cameras corresponding to the eye and then superposes those two images on a stereoscopic display. With such a display device, however, if the interval between the two cameras is significantly different from the interval between the viewer's eyes, he or she will find the resultant stereoscopic image unnatural, which is a problem.

Thus, to overcome such a problem, Patent Document No. 1 discloses a method for making a correction on one of the two images captured by those two cameras on the right- and left-hand sides (which will be simply referred to herein as "right and left cameras") using the image captured by the other camera so that the amount of parallax of the image presented by the display device becomes equal to that of the subject image actually captured by the viewer with his or her eyes.

According to the method of Patent Document No. 1, multiple pairs of corresponding points are extracted from those two images captured by the right and left cameras (which will be referred to herein as "right-eye and left-eye images"). And distance information is collected based on the respective pixel locations of those corresponding points. In this case, from some pixel locations in the right- and left-eye images, no corresponding points may be available. However, the image information of such pixel locations with no corresponding points available should be included in any of the two images that have been captured by the right and left cameras. That is why the parallax-corrected image can be further corrected using such image information. Consequently, a stereoscopic image that should look natural to anybody's eyes can be produced by such a method.

CITATION LIST

Patent Literature

Patent Document No. 1: Japanese Patent Application Laid-Open Publication No. 8-126034 (see Paragraphs #0004 and #0024 through #0033 and FIGS. 3 to 5, in particular)

SUMMARY OF INVENTION

Technical Problem

According to Patent Document No. 1, the interval between the right and left cameras (i.e., the interval between their optical axes during capturing) is supposed to be wider than the interval between the right and left eyes of the viewer who is actually looking at the subject (i.e., the interval between the optical axes during viewing). In that case, the image information of every pixel location in the images generated should certainly be included in any of the images that have been captured by the two cameras.

However, if two images were captured by two image sensing optical systems with a very narrow optical axis interval, which can be built in a cellphone, for example, it would be a totally different story to present a stereoscopic image that should look natural to anybody's eyes even in such a situation. Thus, the present inventors tried to find means for overcoming such a problem.

Specifically, to present a natural stereoscopic image in such a situation, the two images should be generated from two pointing points, of which the interval is wider than the interval between the optical axes of the two image sensing optical systems. In that case, however, some invisible portions that were hidden behind the subject, which was located rather close to the cameras during capturing, could be visible in the images being generated. Nevertheless, the image information of such portions that have been invisible until the images are generated should not be available from any of the two images captured. And if there were such image information missing portions, the quality of the resultant stereoscopic image would be much lower to the viewer's eyes.

It is therefore an object of the present invention to provide a stereoscopic image display device that can still prevent the quality of the stereoscopic image presented to the viewer from being debased due to the presence of those image information missing portions even if two images are captured by two image sensing optical systems with a narrow optical axis interval, thereby displaying a stereoscopic image of quality that should look natural to anybody's eyes.

Solution to Problem

A stereoscopic image display device according to the present invention includes: an image generating section, which uses first and second images that have been captured by two image capturing sections that are arranged at a first optical axis interval to generate two images to be viewed from two viewing points that are spaced from each other by a wider interval than the first optical axis interval; and a display section for presenting the two images that have been generated by the image generating section to a user's left and right eyes, respectively. The image generating section includes: a coordinate transformation section for transforming, on a unit element basis, the coordinates of at least one of the first and second images captured so that the amount of parallax of the two images generated by the image generating section becomes equal to the amount of parallax between the two viewing points; and an image interpolation section for generating, by interpolation, image information for some pixels that have lost their own image information as a result of the coordinate transformation.

In one preferred embodiment, the stereoscopic image display device further includes an instructing section, which is controllable by the user. In accordance with a signal supplied from the instructing section, the coordinate transformation section outputs a coordinate transformed image, of which the coordinates have been transformed, and a coordinate untransformed image, of which the coordinates have not been transformed yet, to the display section.

In this particular preferred embodiment, the display section presents the coordinate untransformed image to the user's dominant eye.

In another preferred embodiment, the coordinate transformation section generates an image by adding a value representing the amount of parallax between the two viewing points to the coordinate values of each unit element of the first image and then outputs the image thus generated and the first image as the coordinate transformed image and the coordinate untransformed image, respectively.

In an alternative preferred embodiment, the coordinate transformation section generates an image by adding a value representing the amount of parallax between the two viewing points and a value representing the difference in amount of parallax between the first and second images to the coordinate values of each unit element of the first image captured and then outputs the image thus generated and the second image as the coordinate transformed image and the coordinate untransformed image, respectively.

In still another preferred embodiment, the image generating section further includes a coordinate transformation switching section for changing, in accordance with the signal supplied from the instructing section, the targets of the coordinate transformation of each unit element from one of the first and second images captured into the other.

In yet another preferred embodiment, the coordinate transformation section is set by default so as to present the coordinate transformed image to the user's left eye.

In yet another preferred embodiment, the coordinate transformation section carries out the transformation by adding, in mutually opposite directions, a value representing a half of the difference between the two viewing points' amount of parallax and the first and second images' amount of parallax to the coordinate values of each unit element of both of the first and second images captured.

In yet another preferred embodiment, with respect to the image, of which some pixels have lost their image information, the image interpolation section generates interpolating image information using information of the rest of the image other than those pixels.

In yet another preferred embodiment, the image interpolation section generates the interpolating image information based on information about the intensity of at least one of two pixels that are adjacent to each pixel that has lost its image information on right- and left-hand sides in a base line direction.

In a specific preferred embodiment, the two viewing points have an interval of 60 mm to 70 mm.

An image capture and display apparatus according to the present invention includes: a stereoscopic image display device according to any of the preferred embodiments of the present invention described above; and two image capturing sections, which are arranged at the first optical axis interval. The first and second images have been respectively captured by the two image capturing sections.

Another stereoscopic image display device according to the present invention includes: an image generating section, which uses one image that has been captured by an image capturing section and information about the distance to a subject to shoot to generate two images to be viewed from two viewing points that are spaced from each other by a predetermined interval; and a display section for presenting the two images that have been generated by the image generating section to a user's left and right eyes, respectively. The image generating section includes: a coordinate transformation section for carrying out a transformation by adding the amount of parallax between the two viewing points to the coordinate values of each unit element of the one image captured; and an image interpolation section for generating, by interpolation, image information for some pixels that have lost their own image information as a result of the coordinate transformation.

In one preferred embodiment, the image generating section further includes a coordinate transformation switching section for changing the directions in which the amount of parallax between the two viewing points is added to the coordinate values of each unit element of the one image captured.

In another preferred embodiment, the image generating section further includes an output section for outputting a coordinate transformed image and a coordinate untransformed image to the display section, which presents the coordinate untransformed image to the user's dominant eye.

Advantageous Effects of Invention

According to the present invention, coordinate transformation is carried out so that the amount of parallax of an image presented by the display device becomes equal to the one between two viewing points that are arranged at a wider interval than a first optical axis interval, thereby generating a three-dimensional image that should look natural to anybody's eyes. On top of that, by making interpolation on portions that have lost their own image information as a result of the coordinate transformation, it is also possible to prevent the quality of the image presented from being debased.

DESCRIPTION OF EMBODIMENTS

Embodiment 1

Hereinafter, Preferred Embodiments of a stereoscopic image display device (or image capture and display apparatus) according to the present invention will be described with reference to the accompanying drawings.

Figure 1:
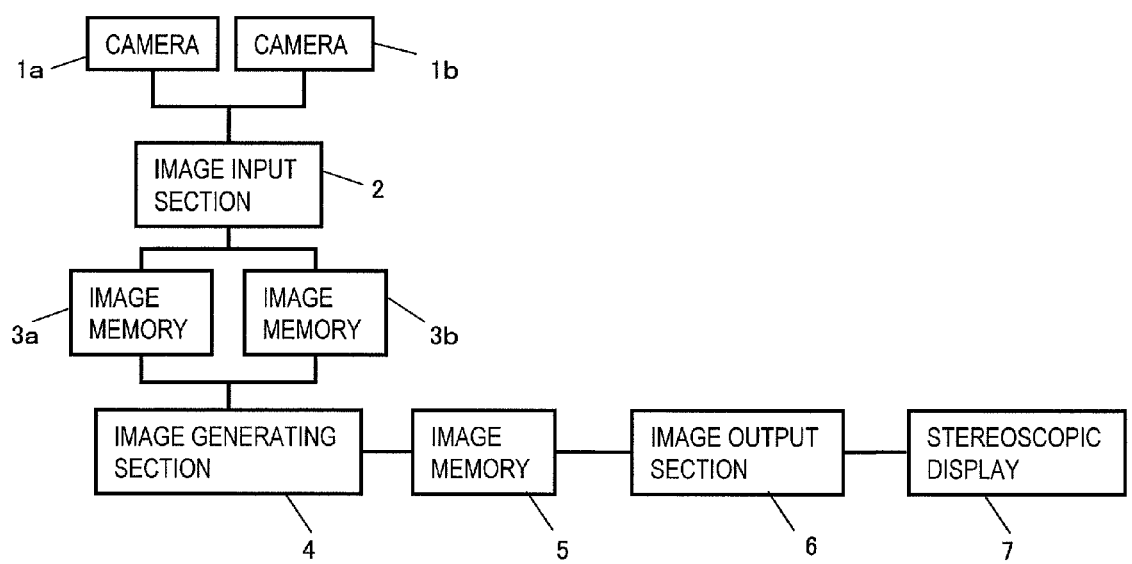
FIG. 1 is a block diagram illustrating a stereoscopic image display device as a first specific preferred embodiment of the present invention.

FIG. 1 is a block diagram illustrating a configuration for a stereoscopic image display device (or image capture and display apparatus) as a first specific preferred embodiment of the present invention. As shown in FIG. 1, the stereoscopic image display device of this preferred embodiment includes a left camera 1a, a right camera 1b, an image input section 2 connected to the left and right cameras 1a and 1b, image memories 3a and 3b connected to the image input section 2, an image generating section 4 connected to the image memories 3a and 3b, another image memory 5 connected to the image generating section 4, an image output section 6 connected to the image memory 5, and a stereoscopic display connected to the image output section 6.

The left and right cameras 1a and 1b are arranged so that the optical axes of their optical systems (lenses) are parallel to each other and have a first optical axis interval B0 between them. The image input section 2 transforms video signals, representing the images captured by the left and right cameras 1a and 1b, into digital image data on a frame-by-frame basis.

The image data that has been generated by the image input section 2 through transformation is then stored in the image memories 3a and 3b. For example, the image data that have been generated based on the images captured by the left and right cameras 1a and 1b may be stored in the image memories 3a and 3b, respectively.

The image generating section 4 generates image data, which is compatible with the format of the stereoscopic display 7, based on the image data that are stored in the image memories 3a and 3b. The image data thus generated by the image generating section 4 is then stored in the output image memory 5. Then the image output section 6 converts the digital image data that is stored in the image memory 5 into a video signal and outputs that signal to the stereoscopic display 7.

Next, the flow of the processing to get done by the image generating section 4 in the stereoscopic image display device of the first preferred embodiment will be described with reference to FIGS. 2(a) and 2(b).

FIG. 2(a) is a block diagram illustrating a configuration for the image generating section 4. As shown in FIG. 2(a), the image generating section 4 includes a calibration processing section 101, a capturing induced amount of parallax extracting section 102 connected to the calibration processing section 101, a corrected amount of parallax calculating section 103 connected to the capturing induced amount of parallax extracting section 102, a coordinate transformation section 104 connected to the corrected amount of parallax calculating section 103, an image interpolation section 105 connected to the coordinate transformation section, and a coordinate transformation switching section 106 connected to the corrected amount of parallax calculating section 103 and the coordinate transformation section 104.

FIG. 2(b) is a flowchart showing the flow of the processing to get done by the image generating section 4.

First, in Step S101, the calibration processing section 101 performs calibration processing on the two images that are stored in the image memories 3a and 3b. As a result, correction is made on the focal lengths of the two cameras (i.e., their zoom powers) and on the distortion, and collimation, Bayer interpolation and other kinds of processing are done.

Next, in Step S102, the capturing induced amount of parallax extracting section 102 extracts the amount of parallax between the two images, which will be referred to herein as a "capturing induced amount of parallax". Hereinafter, it will be described with reference to FIGS. 3 through 6 how the capturing induced amount of parallax extraction processing can get done on the two images.

Figure 3:
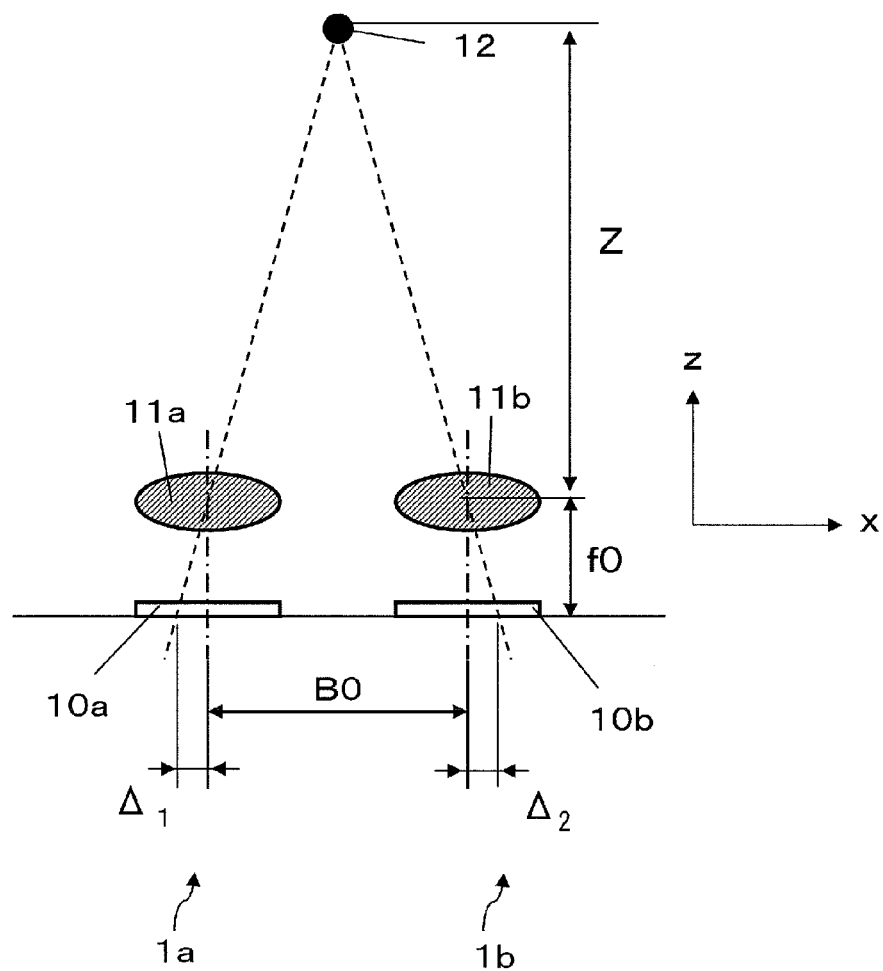
FIG. 3 illustrates a parallax between two cameras that are arranged parallel to each other in the first preferred embodiment.

FIG. 3 illustrates a parallax between the two images that have been captured by the left and right cameras 1a and 1b. In FIG. 3, x indicates the horizontal direction, y (not shown) indicates the vertical direction, and z indicates the depth direction.

The left camera 1a includes an optical system (lens) 11a and an image sensor 10a. Likewise, the right camera 1b also includes an optical system (lens) 11b and an image sensor 10b. The respective optical axes of these optical systems 11a and 11b are both parallel to the z direction.

The optical systems 11a and 11b of the left and right cameras 11a and 11b are arranged side by side in the x direction. The optical axes of the optical systems 11a and 11b, which are parallel to each other in the z direction, have an optical axis interval B0 between them.

The image sensors 10a and 10b of the left and right cameras are spaced apart from the optical systems 11a and 11b and are arranged at a distance that is equal to the focal length f0 of these optical systems 11a and 11b.

A light ray coming from an object point 12 on the subject, which is located in front of these cameras, is condensed by the optical systems 11a and 11b, thereby producing an image on the photosensitive plane of each of these image sensors 10a and 10b. The image that has been produced on the photosensitive plane is transformed into an electrical signal by photodiodes on the photosensitive plane of the image sensor and then output as an image signal.

In this case, the two cameras 1a and 1b are arranged and spaced apart from each other so that the optical axes of their optical systems are parallel to each other. That is why a parallax will be produced between the two images captured by the cameras 1a and 1b. In the arrangement shown in FIG. 3, however, the positions of these two cameras are different only in the x direction, and therefore, a parallax will also be produced only in the x direction and each pair of corresponding points of the two images has the same y coordinate.

If Z is the distance as measured in the z direction from the object point 12 on the subject to the respective centers of the lenses of the cameras 1a and 1b and if $\Delta$ is the amount of parallax produced between the two images captured (which is the sum of the distances $\Delta_1$ and $\Delta_2$, as measured in the x direction on the photosensitive plane of the image sensors 10a and 10b, from their optical axis to the point where the object point 12 is imaged), the following Equation (1) is satisfied:

$$\Delta = f0 \cdot B0 / Z \tag{1}$$

It should be noted, however, that if the object point 12 is imaged on the −x side with respect to the optical axis on the photosensitive plane of the image sensor 10a, the distance $\Delta_1$ has a positive value. On the other hand, if the object point 12 is imaged on the +x side with respect to the optical axis on the photosensitive plane of the image sensor 10b, the distance $\Delta_2$ also has a positive value. Equation (1) indicates that the amount of parallax produced varies with the distance Z. The viewer will use this amount of parallax as a piece of information for calculating the distance to the object.

Figure 4:
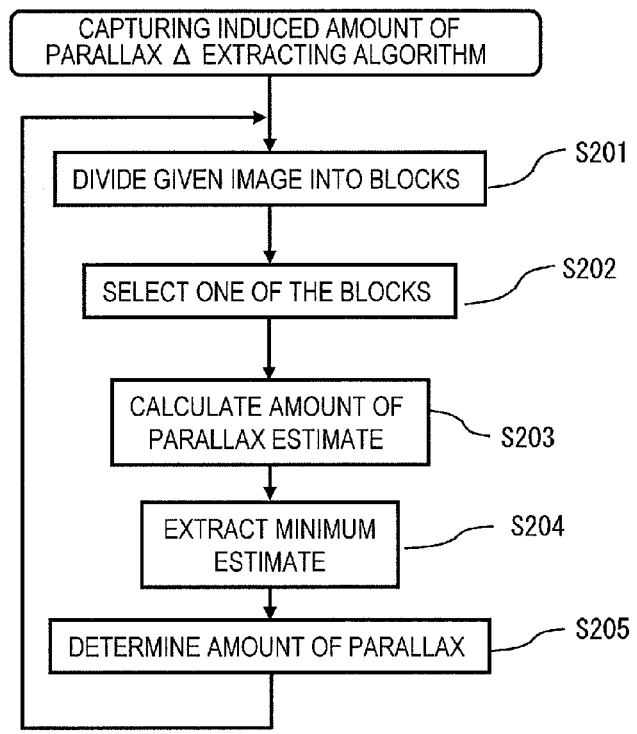
FIG. 4 is a flowchart showing the flow of an amount of parallax extracting algorithm according to the first preferred embodiment.
Figure 5:
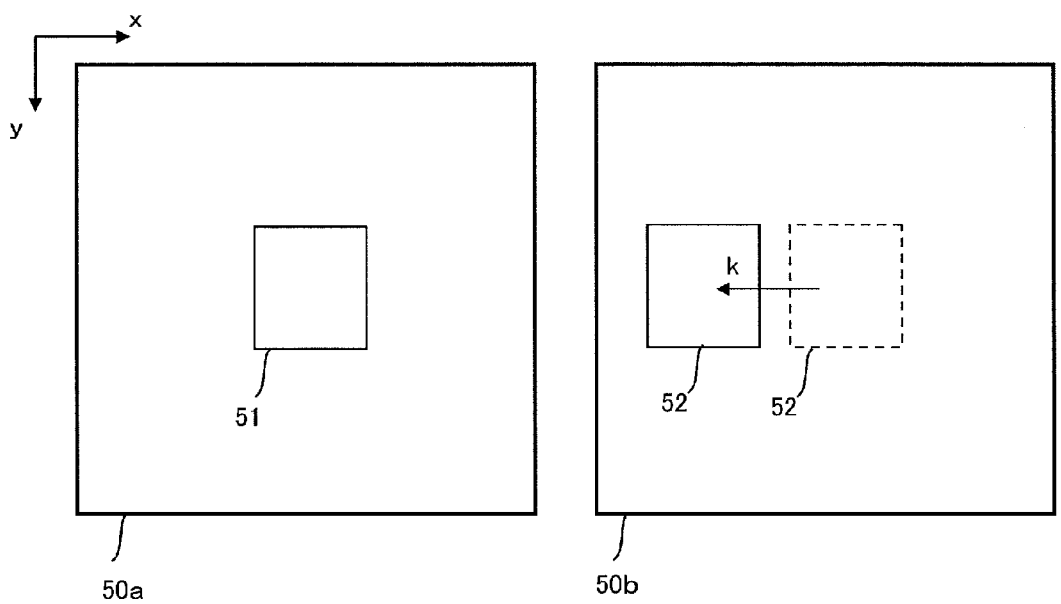
FIG. 5 illustrates detection blocks for use in the processing step S102 of extracting a capturing induced amount of parallax Δ in the first preferred embodiment.

FIG. 4 is a flowchart showing the basic flow of a capturing induced amount of parallax extracting algorithm. And FIG. 5 illustrates detection blocks on a left image 50a and a right image 50b that have been obtained by subjecting the images stored in the image memories 3a and 3b to the calibration processing.

First, in Step S201 of the amount of parallax extracting algorithm, the left image 50a of these two images is divided into a number of blocks, each of which may have a size of 4×4 pixels to 64×64 pixels and may have its size determined arbitrarily according to the dimensions of the subject. It should be noted that if the zoom power of the optical system is increased, the size of each of those detection blocks is preferably increased, too. Those blocks do not have to be square ones, either. Next, in Step S202, one of the multiple detection blocks is selected as a first detection block 51 from the left image 50a. In the meantime, another detection block, which is located at substantially the same location on the other right image 50b, and has almost the same size, as the first detection block 51, is selected as a second detection block 52.

Subsequently, in Step S203, in order to search the right image 50b for a block associated with the first detection block 51 on the left image 50a, an amount of parallax estimate is calculated.

The amount of parallax estimate may be calculated in the following manner, for example. As shown in FIG. 5, the second detection block 52 that has been initially set on the right image 50b is shifted by k pixels (where k is an arbitrary integer) in the x-axis direction. Next, the difference in detected luminance value between each pixel in the first detection block 51 and its associated pixel in the second detection block 52 is calculated. And the sum of those differences in detected luminance value between every pair of pixels in these two detection blocks is calculated as the amount of parallax estimate R(k) of the k value. That is to say, if the luminance value detected from a pixel at coordinates (a, b) in the first detection block 51 is GG1(a, b) and if the one detected from a pixel at coordinates (a+k, b) in the second detection block 53 is GG2(a+k, b), the amount parallax estimate R(k) is calculated by the following Equation (2):

$$R(k) = \sum_a \sum_b |GG1(a, b) - GG2(a + k, b)| \quad (2)$$

It should be noted that if the left and right images 50a and 50b are color images to be represented in the three primary colors of red (R), green (G) and blue (B), the detected luminance values of green (G) may be compared to each other, for example.

This amount of parallax estimate R(k) changes with the k value. By performing these processing steps S202 and S203 with multiple values of one through n substituted for k, the amount of parallax estimate R(k) is calculated. The amount of parallax estimate R(k) represents the degree of correlation between the image portion in the second detection block 52 that has been shifted by k pixels and its associated image portion in the first detection block 51. That is to say, the smaller the amount of parallax estimate R(k), the more similar the image portions in those two detection blocks are.

Figure 6:
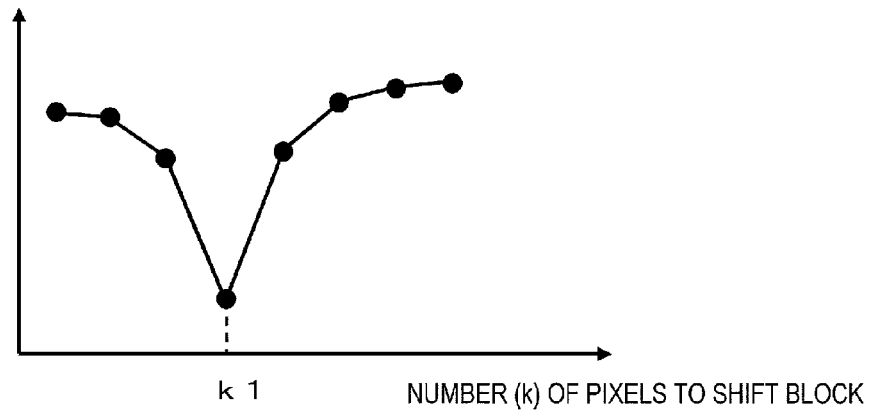
FIG. 6 is a graph showing how the amount of parallax estimate changes with the number k of pixels to shift a detection block in the first preferred embodiment.

Next, in Step S204, the minimum value is extracted from the respective amount of parallax estimates that have been calculated in the previous processing step S203. FIG. 6 is a graph showing how the amount of parallax estimate changes with the number k of pixels by which the second detection block 52 is shifted. In FIG. 6, the abscissa represents the number k of pixels to shift it in the x direction and the ordinate represents the amount of parallax estimate R(k). As shown in FIG. 6, the amount of parallax estimate R(k) becomes minimum when k=k1. That is to say, these results reveal that the image portions in the two detection blocks 51 and 52 are most similar to each other when k=k1.

Then, in Step S205, the number k of pixels that resulted in that minimum value (i.e., the amount of parallax) is extracted. That is to say, it is decided that the image portion in the second detection block 52 agrees with the image portion in the first detection block 51 when the second detection block 52 on the right image 50b is shifted by k1 pixels in the x direction from its initial location. Consequently, the number k1 of pixels to shift is determined to be the amount of parallax Δ between the first and second detection blocks 51 and 52 (i.e., Δ=k1).

By performing this series of processing steps on each and every one of the divided blocks that have been obtained in the processing step S201, the amount of parallax is extracted and the same amount of parallax is allocated to each pixel within those blocks. As a result of these processing steps, the amount of parallax of each and every pixel of the left image 50a with respect to the right image 50b is calculated.

Now look at FIGS. 2(a) and 2(b) again. In Step S103, the amount of parallax to be obtained if the images are captured at the interval between a person's eyes (i.e., the corrected amount of parallax) is calculated. This calculation is made by the corrected amount of parallax calculating section 103 shown in FIG. 2(a). In this case, if Δ' is the corrected amount of parallax, f is the equivalent focal length of that person's eyes, and B is the interval between his or her eyes (which is usually in the range of 60-70 mm), the following Equation (3) can be derived by modifying Equation (1):

$$\Delta' = \{(f \cdot B)/(f0 \cdot B0)\}\Delta \quad (3)$$

This equation indicates that the amount of parallax changes with the base line length during viewing. In Step S103, the corrected amount of parallax is calculated by this Equation (3).

The degree of stereoscopic impression the viewer gets when viewing an image presented to him or her will vary according to the display screen size, the pixel size, and the focal length of the viewer's eyes. For that reason, the corrected amount of parallax Δ is preferably further adjusted according to these values. Specifically, the display screen size and the pixel size thereof are the display device's own values and the degree of adjustment to get done due to these factors (i.e., the rate of conversion of the amount of parallax) is always constant irrespective of the subject. That is why it is appropriate to determine the rate of conversion and write it in a memory of the image generating section before the display device is shipped as a product. And when the rate of conversion is determined, it is preferred that the image completed through this series of processing steps be presented on the stereoscopic display to have the degree of stereoscopic impression it produces checked out. On the other hand, to cope with an individual difference in eyes' focal length, multiple different rates of conversion may be written into the memory and any one of them may be arbitrary chosen by the user. According to such a method, the best stereoscopic image can be displayed for each individual user.

Next, the coordinate transformation section 104 shown in FIG. 2(a) performs Step S104. This is a processing step for correcting the amount of parallax by transforming the coordinates of either the left image 50a or the right image 50b on a unit element basis so that the amount of parallax between the left and right images 50a and 50b becomes equal to the corrected amount of parallax obtained in the previous processing step S103. As used herein, the "unit element" refers to a single unit for performing the coordinate transformation on the target pixel and typically has a size of one pixel. In this example, the coordinate transformation is supposed to be performed on the left image 50a. This processing step will be described briefly with reference to FIG. 7.

Figure 7:
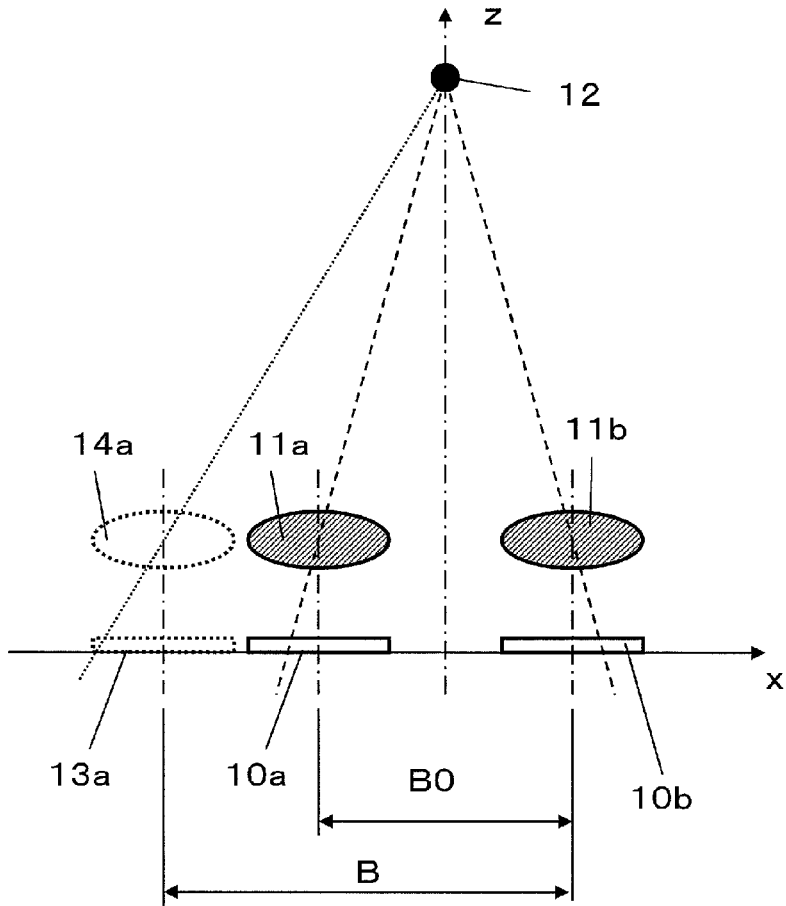
FIG. 7 illustrates the principle of coordinate transformation according to the first preferred embodiment.

In FIG. 7, any component also shown in FIG. 3 and having substantially the same function as its counterpart is identified by the same reference numeral and the detailed description thereof will be omitted herein.

In this processing step, the coordinates of each unit element of the left image 50a that has been detected by the image sensor 10a are transformed, thereby correcting the amount of parallax and reproducing an image to be produced by a virtual optical system 14a and detected by a virtual image sensor 13a. In this example, in the image that has been detected by the image sensor 10a and the image to be detected by the virtual image sensor 13a, the subject image is supposed to be deformed to substantially the same degree.

Next, the processing step of reconstructing the image to be formed on the virtual image sensor 13a based on the left image 50a that has been produced on the image sensor 10a will be described with reference to FIG. 8.

Figure 8:
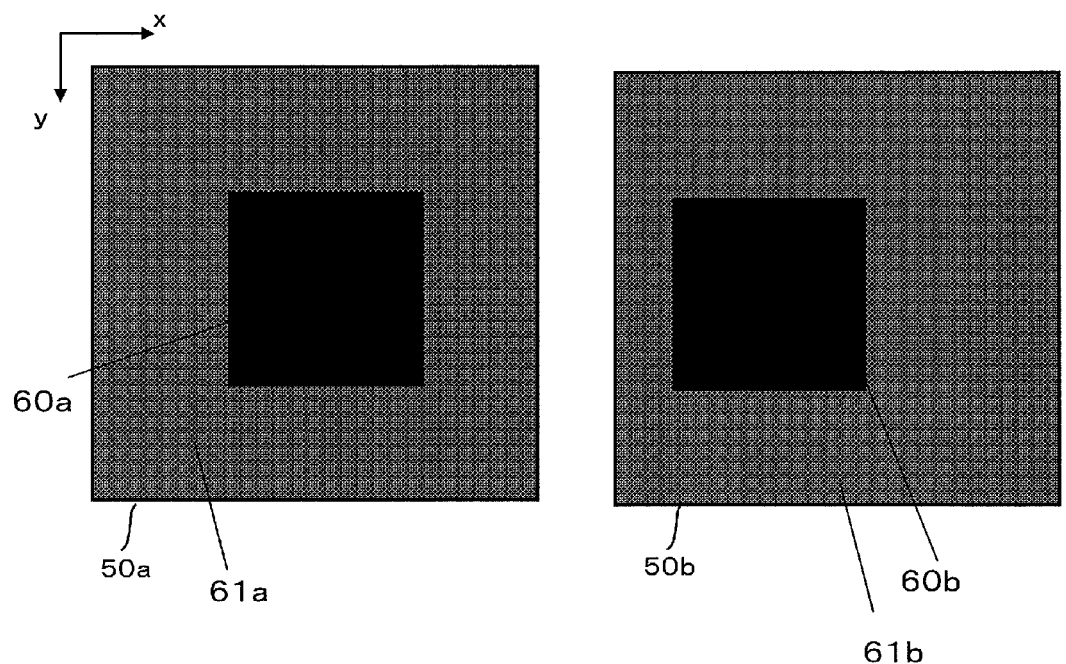
FIG. 8 illustrates images that have been produced on image sensors according to the first preferred embodiment.

FIG. 8 illustrates a subject image 60a and a background image 61a, which form respective parts of the left image 50a, and a subject image 60b and a background image 61b, which form respective parts of the right image 50b. It can be seen easily that the subject image is produced at mutually different locations of these two images and that there is a parallax between these two images. In the processing step S104, the coordinate transformation is carried out using the corrected amount of parallax that has been calculated in the previous process step S103, thereby correcting the parallax between these two images. In this manner, the image to be captured by a virtual camera that consists of the virtual image sensor 13a and virtual optical system 14a and that is located at an optical axis interval B is predicted and reproduced.

In this case, the left image 50a already has a parallax, which has been caused through capturing, with respect to the right image 50b. That is why the processing step of adding (corrected amount of parallax Δ'-capturing induced amount of parallax Δ) to the coordinate values of each unit element of the left image 50a is performed. Specifically, this coordinate transformation is carried out using the following equation (4):

$$\begin{bmatrix} X \\ Y \end{bmatrix} = \begin{bmatrix} x \\ y \end{bmatrix} + \begin{bmatrix} \Delta' - \Delta \\ 0 \end{bmatrix} \quad (4)$$

The coordinates of every unit element are transformed by this Equation (4). In this case, the coordinates yet to be transformed are (x, y) but the transformed coordinates are (X, Y). Also, according to the arrangement of this preferred embodiment, the parallax is caused only in the x direction, and therefore, only coordinates in the x direction need to be considered in Equation (4).

Figure 9:
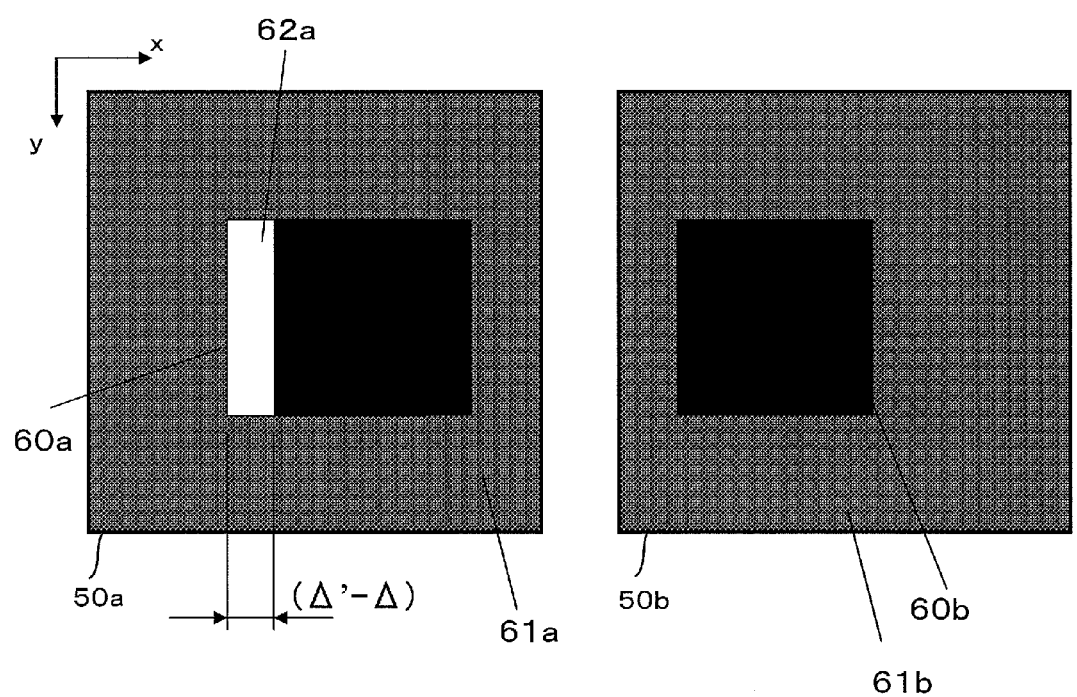
FIG. 9 shows a result of the coordinate transformation according to the first preferred embodiment.

FIG. 9 shows a result of the coordinate transformation. The subject image 60a has been shifted in the +x direction.

It should be noted that as a result of the processing steps S102 and S103, every pixel now has capturing induced amount of parallax and corrected amount of parallax values as its information.

By performing this processing step S104, the amount of parallax can be corrected into a value that would be obtained if the images were captured at the interval between the viewer's own eyes. As a result, a stereoscopic image can be displayed without having the viewer find it unnatural.

However, as a result of the amount of parallax correction that has been done in the processing step S104, an image information missing portion 62a is produced as shown in FIG. 9. This is because in this processing step, the images have been generated from viewing points that are located outside of the two viewing points during capturing. Unless the interpolation processing is carried out, a Low signal would be output from the region associated with the image information missing portion 62a. That is why the image information missing portions 62a actually looks solid black but is illustrated in white in FIG. 9 for the sake of convenience.

Next, in Step S105, the image interpolation section 105 shown in FIG. 2(a) performs interpolation processing on the image information missing portion 62a that has been produced as a result of the amount of parallax correction done in the previous processing step S104.

Figure 10:
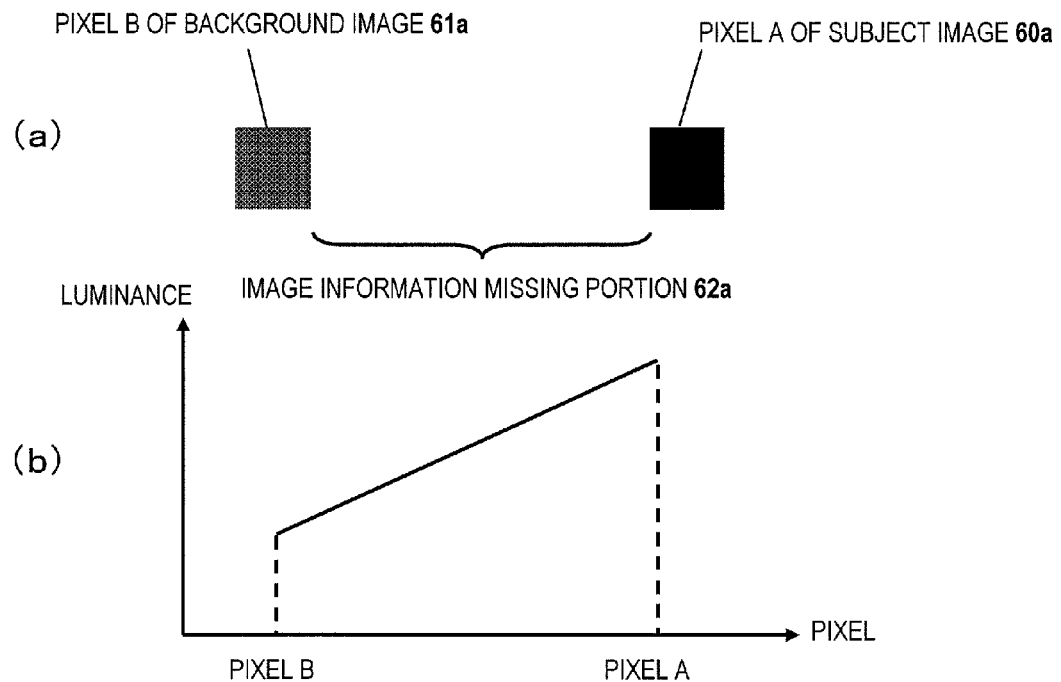
FIGS. 10(a) and 10(b) illustrate how to make interpolation on an image information missing portion according to the first preferred embodiment.

FIG. 10(a) illustrates a boundary pixel, which is included in the subject image 60a shown in FIG. 9 and which is located on the boundary between the subject image 60a and the background image 61a, another boundary pixel, which is included in the background image 61a and which is located on the boundary between the subject image 60a and the background image 61a, and the image information missing portion 62a, all of which have been enlarged to the pixel level. In this case, Pixel A represents the color block, while Pixel B represents a color gray, which is lighter in color than Pixel A.

Between these Pixels A and B, there is a group of pixels that belong to the image information missing portion 62a. Thus, according to this preferred embodiment, with the fact that the parallax is produced only in the x direction taken into consideration, the color information of the image information missing portion 62a is generated as a sort of linear function based on the color information of Pixels A and B that are located at both ends in the x direction as shown in FIG. 10(b), thereby getting the interpolation processing done. As used herein, the "color information" refers to information about the respective intensities of primary colors that form a given image. For example, if the image is a color image to be represented in the three primary colors of red (R), green (G) and blue (B), the intensity information is generated for each of the three primary colors. The intensity information may be a piece of information to be represented by the grayscale of each color. That is to say, the color intensities are increased almost linearly from the pixel that is adjacent to Pixel B in the image information missing section 62a through the pixel that is adjacent to Pixel A. As a result of this processing step, the color information can be given to each of the pixels belonging to the image information missing portion.

Figure 11:
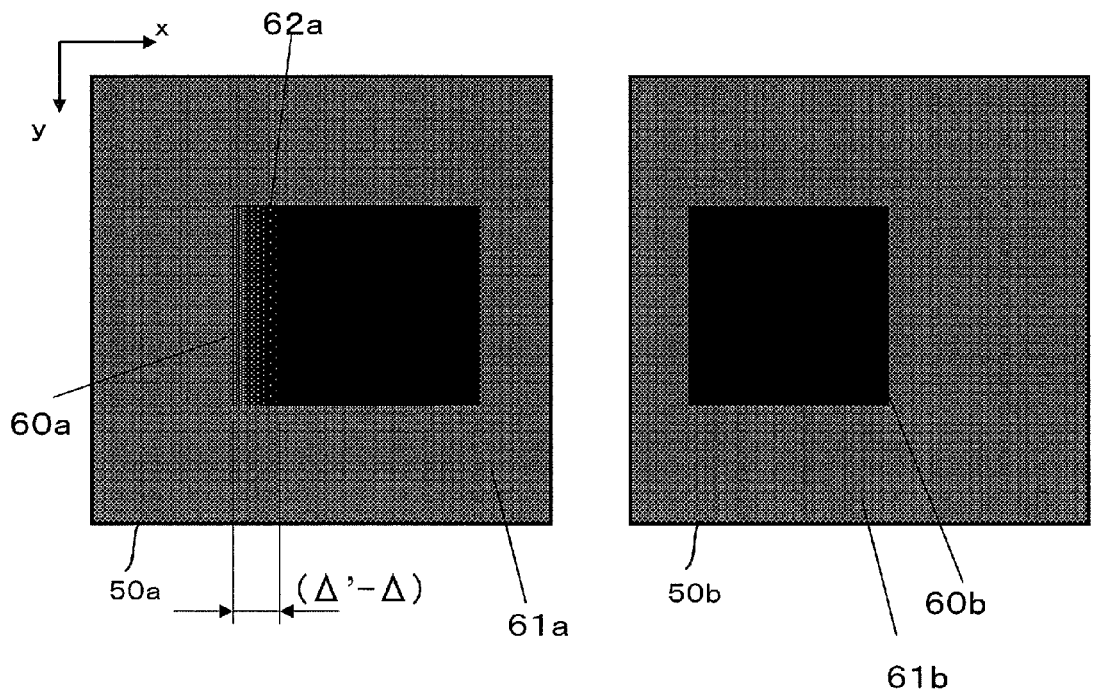
FIG. 11 shows a result of the interpolation that has been made on the image information missing portion according to the first preferred embodiment.

A result of this interpolation processing is shown in FIG. 11. It can be seen easily that there is no image information missing portion anywhere in the entire image. Consequently, a stereoscopic image of quality can be provided while significantly reducing the unnatural impression that the viewer would get otherwise.

In the preferred embodiment described above, a linear interpolation is supposed to be performed. However, the interpolation may also get done using any other function of a higher order (such as a quadratic function) or an exponential function as well. Alternatively, interpolation may even get done based on the color intensities of multiple pixels that are adjacent to the image information missing portion in the base line direction. In that case, the interpolation may be carried out using the average of the R, G and B intensities of nine pixels, which are arranged in three columns and three rows and adjacent to each boundary pixel of the image information missing portion (i.e., a pixel of the image information missing portion that is located on the boundary with the other portions). Yet alternatively, the color intensity of Pixel B of the background image may also be used as the color intensity of a pixel in the image information missing portion.

If the given image is a color image as described above, the image is interpolated using color intensities. However, if the given image is a monochrome one, the image may be interpolated using luminances.

Furthermore, an even higher resolution can be achieved by making an uncorrected image incident on the viewer's dominant eye. This is because a human being recognizes the shape of an object mainly based on information that has been gotten with his or her dominant eye.

This reaction is also used to determine a person's dominant eye. Specifically, to do that, a person needs to extend one of his or her arms, hold up his or her index finger and then watch its fingertip with both of his or her eyes, with only his or her left eye, and with only his or her right eye. In that case, the eye with which he or she could locate his or her index finger at the same position as when he or she used both eyes should be his or her dominant eye. This method indicates that even when a person is viewing an object with both of his or her eyes, he or she recognizes the shape of the object mainly with his or her dominant eye and the other, non-dominant eye just works complementarily. And the present inventors obtained the basic idea of our invention from this method. That is to say, by providing an arrangement in which an image of quality, which has been subjected to neither coordinate transformation nor interpolation processing on the image information missing portion, is incident on the viewer's dominant eye, those portions that would debase the image quality and that are viewed with his or her non-dominant eye are interpolated inside his or her brain. As a result, the overall image quality sensed by the viewer can be improved. On top of that, by making an image that has been subjected to the coordinate transformation and the interpolation on the image information missing portion strike the other eye, the viewer can get mainly depth information from it and therefore a stereoscopic image of quality can be reproduced.

Specifically, after the corrected amount of parallax $\Delta'$ has been calculated in Step S103 shown in FIG. 2(b), the processing step S106 of switching the target of the coordinate transformation from the left image 50a to the right image 50b, and vice versa, is carried out. This switching is done by the coordinate transformation switching section 106 shown in FIG. 2(a). After that, the coordinate transformation processing is carried out in Step S104.

The coordinate transformation switching section 106 may change the targets of the coordinate transformation from one of the two images to the other in accordance with a signal supplied from the instructing section 109 shown in FIG. 2(a), for example. The instructing section 109 does not have to be a particular one but may be implemented as any physical structure that is controllable by the user. Examples of such structures include a touchscreen panel on the stereoscopic display shown in FIG. 1, a button on the outer surface of the display device, or even a remote controller.

At any point in time after the user turned this display device ON and before the coordinate transformation is performed in Step S104, the display device presents the user a sample image to be produced by subjecting the left image 50a to the coordinate transformation and a sample image to be produced by subjecting the right image 50a to the coordinate transformation.

In response, the user chooses one of these two sample images that he or she has found having the higher image quality and controls the instructing section 109 accordingly. The image that the user has found having the higher image quality is an image that has been obtained by subjecting the image to be viewed with his or her other non-dominant eye to the coordinate transformation. And in accordance with the signal supplied from the instructing section 109 that has been controlled by the user, the coordinate transformation switching section 106 can appropriately change the modes of image transformation. More specifically, when the user chooses one of the two sample images and controls the instructing section 109 accordingly, a signal indicating whether the sample image chosen by him or her has been obtained from the left image 50a or the right image 50a through the coordinate transformation is supplied to the coordinate transformation switching section 106. If the chosen image has been obtained by subjecting the left image 50a to the coordinate transformation, the coordinate transformation switching section changes its modes of operation so as to transform the coordinates on the left image 50a but not to transform the coordinates on the right image 50a. On the other hand, if the chosen image has been obtained by subjecting the right image 50a to the coordinate transformation, the coordinate transformation switching section changes its modes of operation so as to transform the coordinates on the right image 50a but not to transform the coordinates on the left image 50a.

Figure 2:
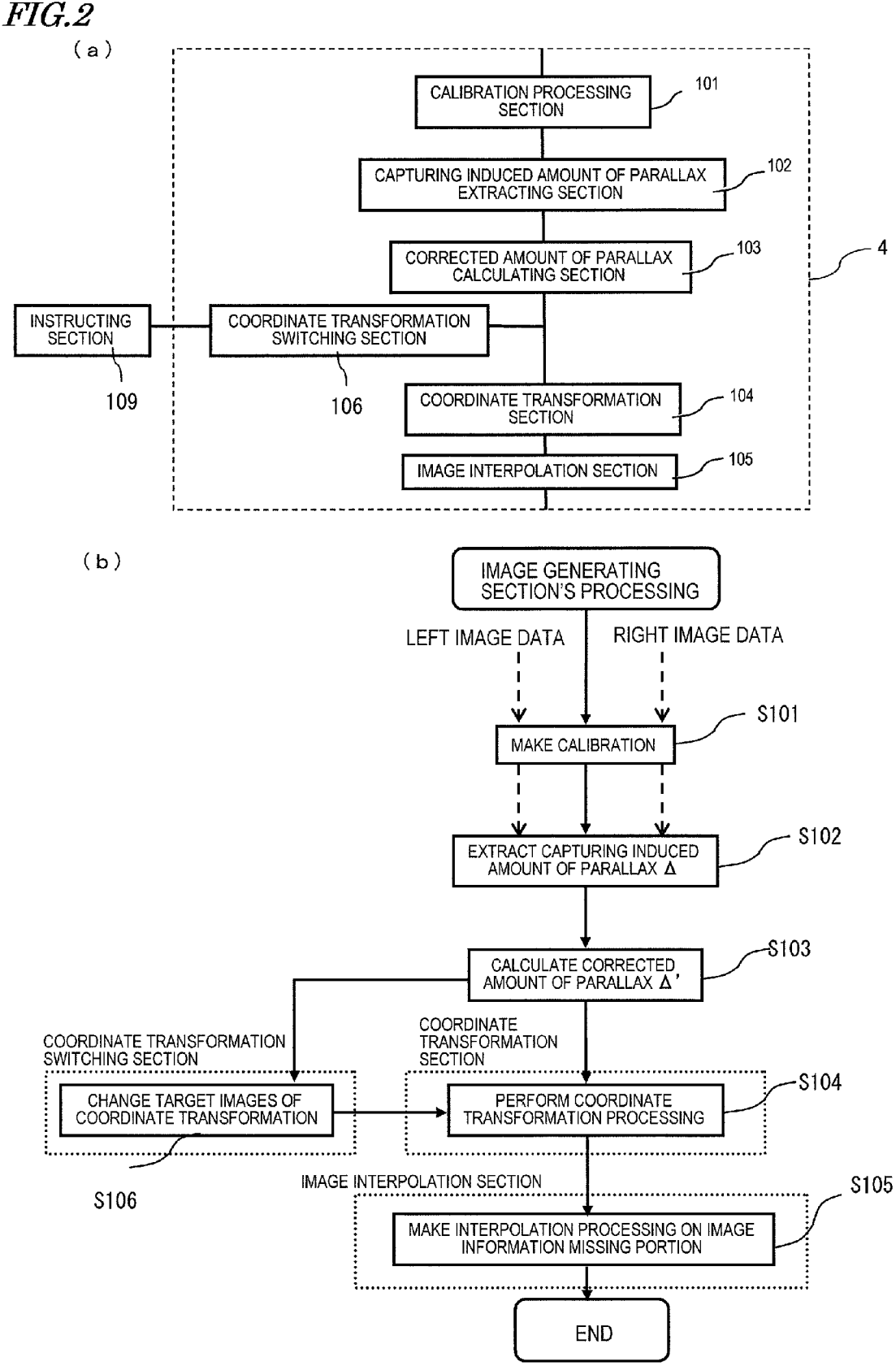
FIG. 2(a) is a block diagram illustrating a specific configuration for the image generating section 4 and FIG. 2(b) is a flowchart showing the flow of the processing to get done by the image generating section 4.

In FIG. 2, the instructing section 109 and the coordinate transformation switching section 106 are supposed to be provided separately from each other. However, the instructing section 109 may have the function of the coordinate transformation switching section 106. That is to say, the instructing section 109 may perform the processing of changing the targets of coordinate transformation from the left image 50a into the right one 50b, or vice versa, and may notify the coordinate transformation section 104 of the result of the switching processing. If the instructing section 109 has the function of the coordinate transformation switching section 106, then there is no need to provide the coordinate transformation switching section 106. In that case, the output terminal of the instructing section 109 is connected between the corrected amount of parallax extracting section 103 and the coordinate transformation section 104.

The display device of this preferred embodiment may be designed in this manner so that the user's choice is stored as the device's standard value. However, unless the user controls the instructing section 109 in such a configuration, the corrected amount of parallax $\Delta'$ is calculated in Step S103 and then the coordinate transformation processing step S104 is carried out using the standard value by default. Generally speaking, the majority of people will use their right eye as the dominant eye. For that reason, it is appropriate to set this display device so that the coordinate transformation is performed only on the left-eye image but that the right-eye image is just output as it is without correcting it at all.

Optionally, the display device of this preferred embodiment may also be designed so as to present the user such sample images and make him or her choose one of the two that he or she finds superior to the other, every time shooting is done.

As described above, by using the instructing section 109 that is controllable by the user and the coordinate transformation switching section 106 that changes the targets of coordinate transformation from one of the two images to the other in accordance with the signal supplied from the instructing section 109, the image of the higher quality can strike his or her dominant eye. As a result, a stereoscopic image can be displayed while improving the image quality.

Optionally, the image generating section may prepare a set of images to present to one user, who uses his or her right eye as the dominant eye, and another set of images to present to another user, who uses his or her left eye as the dominant eye, and store those sets of images prepared in a storage section (such as the image memory 5 shown in FIG. 1). The former set of images to present to the user who uses his or her right eye as the dominant eye consists of a right-eye image that has not been subjected to coordinate transformation by the coordinate transformation section and a left-eye image, of which the coordinates have been transformed by the coordinate transformation section to achieve a predetermined amount of parallax and of which the image information missing portion has been interpolated by the image interpolation section. On the other hand, the latter set of images to present to the user who uses his or her left eye as the dominant eye consists of a left-eye image that has not been subjected to coordinate transformation by the coordinate transformation section and a right-eye image, of which the coordinates have been transformed by the coordinate transformation section to achieve a predetermined amount of parallax and of which the image information missing portion has been interpolated by the image interpolation section. By doing this, even if an image that has been shot by one user is presented to another user, one of those two sets of images, which has been prepared for someone who uses the right or left eye as the dominant eye just like the latter user, is chosen from the storage section and the coordinate untransformed image in the chosen set of images may be presented on the display section so as to strike the latter user's dominant eye. As a result, a stereoscopic image that the latter user finds having high quality can be provided. Optionally, when that set of images that has been prepared for someone who uses the same dominant eye as the latter user is chosen, a set of images that will be found by him or her to be superior may be chosen. In that case, that another user may be automatically recognized by known face recognition technology and the set of images to be found superior by that particular user may be automatically chosen by reference to the dominant eye information stored in advance.

Hereinafter, it will be described with reference to FIG. 12 how to generate an image to be presented on the stereoscopic display.

Figure 12:
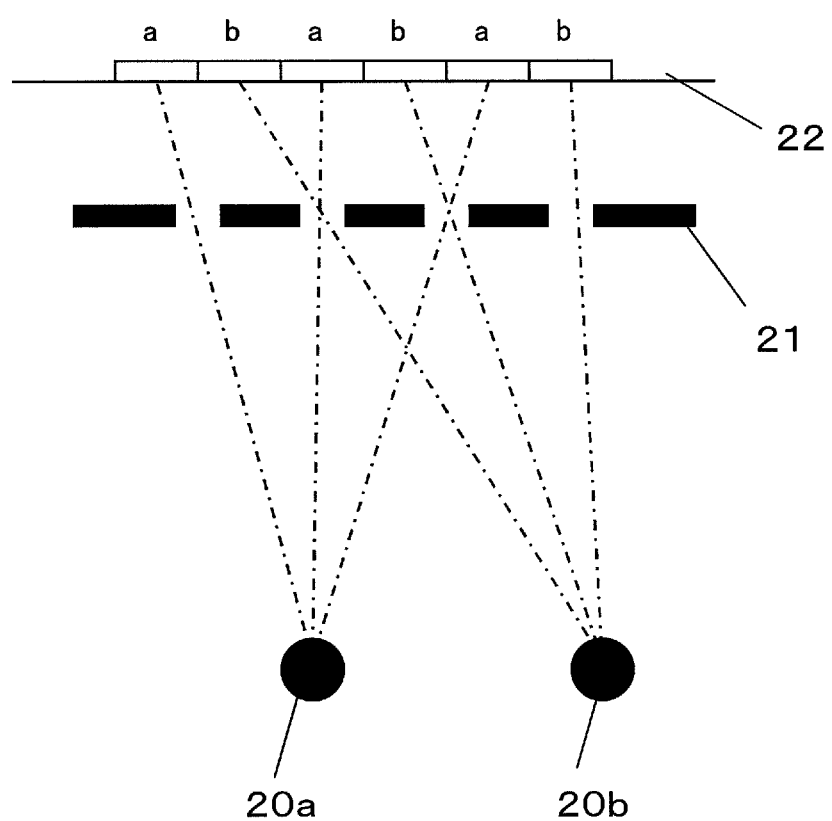
FIG. 12 is a schematic representation illustrating how a stereoscopic display according to the first preferred embodiment conducts a display operation.

FIG. 12 is a schematic representation illustrating an exemplary scheme for a stereoscopic display that functions as a display section. On a liquid crystal display 22, displayed alternately are subdivided images a and b, which have been obtained by vertically subdividing the left- and right-eye images, respectively, into multiple fine image portions. These subdivided images a and b are separately viewed by the viewer with his or her left and right eyes 20a and 20b through a parallax barrier with a number of slits. In the example illustrated in FIG. 12, the left-eye subdivided images a are incident on his or her left eye 20a and the subdivided images b are incident on his or her right eye 20b. As a result, the viewer senses only the left-eye image with his or her left eye 20a and only the right-eye image with his or her right eye. For that reason, if a pair of images with a parallax is displayed as the left- and right-eye images, the viewer will find the resultant synthetic image stereoscopic.

In this preferred embodiment, the image shown in FIG. 11(a) that has been reconstructed as the left-eye image is divided into multiple image portions to be displayed as the subdivided images a shown in FIG. 12. On the other hand, the image shown in FIG. 11(b) that has been reconstructed as the right-eye image is divided into multiple image portions to be displayed as the subdivided images b shown in FIG. 12. In this manner, if respective portions of the images shown in FIGS. 11(a) and 11(b) are alternately displayed row by row by using the stereoscopic display with this arrangement, the viewer can get a stereoscopic impression from the image displayed.

The display of this preferred embodiment is a stereoscopic display with a parallax barrier, and therefore, the images are transformed into such a format. If any other type of three-dimensional image display is used, however, the images should be transformed into a different format suitable for that display. Examples of other alternative schemes that allow the viewer to sense a three-dimensional image with the naked eye include a lenticular scheme and an integral imaging scheme. On the other hand, examples of schemes for making a viewer sense a stereoscopic image through a pair of glasses worn include a scheme that uses a pair of polarization glasses and a scheme that uses a liquid crystal shutter.

Also, image capture devices such as the left and right cameras 1a and 1b shown in FIG. 1 are not essential components for the stereoscopic image display device of the present invention. Alternatively, the stereoscopic image display device of the present invention may also be designed to present a stereoscopic image based on two image data captured by external image capture devices. The same can be said about the image input section 2 and the image memories 3a and 3b shown in FIG. 1, which are not indispensable for the stereoscopic image display device of the present invention, either. Optionally, data may be directly entered from an external memory into the image generating section 4.

Modified Example of Embodiment 1

The first preferred embodiment of the present invention described above is designed to present, according to the format of the stereoscopic display, one of the left and right images 50a and 50b that have been captured by two cameras and calibrated after having subjected it to a parallax correction (i.e., coordinate transformation) but present the other image as it is without correcting it at all.

In this modified example, the left image 50a (which is a coordinate untransformed image) and an image obtained by subjecting the same left image 50a to a coordinate transformation (which is a coordinate transformed image) may be used, for example. According to this modified example, the image that enters the viewer's right eye and the image that enters his or her left eye are originally the same image (i.e., the same captured image). That is why the viewer can sense a stereoscopic image in which planar subjects are arranged in line in the depth direction. That is to say, a sort of "cardboard cut-out phenomenon" is produced. As the viewer gets a stronger stereoscopic impression from such a stereoscopic image, this modified example can be used particularly effectively in a small display device, among other things.

According to this modified example, the coordinate transformation equation (4) is changed into the following Equation (5):

$$\begin{bmatrix} X \\ Y \end{bmatrix} = \begin{bmatrix} x \\ y \end{bmatrix} - \begin{bmatrix} \Delta' \\ 0 \end{bmatrix} \quad (5)$$

Comparing Equations (4) and (5) to each other, it can be seen that in this modified example, greater values should be added to the coordinate values of each unit element than in the first preferred embodiment described above. In other words, a region associated with the image information missing portion expands, and therefore, the viewer will find such an image more unnatural. To avoid such a situation, if the stereoscopic image display device is designed so that the display section presents a coordinate transformed image as an image to be sensed by the viewer with his or her non-dominant eye and a coordinate untransformed image as an image to be sensed by him or her with his or her dominant eye, respectively, the effect of reducing the unnaturalness of the image displayed can be achieved more significantly than in the first preferred embodiment. Specifically, if the stereoscopic image display device of this modified example also includes an instructing section that is controllable by the user and a coordinate transformation section for changing the targets of coordinate transformation from one image to the other in accordance with a signal supplied from the instructing section as described above, the device can selectively perform the coordinate transformation on one of the two images captured and change its targets appropriately as needed. Alternatively, as also described above, the image generating section may further include components for performing the coordinate transformation, and making interpolation on the image information missing portion, on both of the two images captured and then storing the corrected images along with untransformed and uncorrected ones. In that case, even if the users have changed while the device is being used, the images to be displayed may be changed so that an uncorrected image enters the viewer's dominant eye. Then, a stereoscopic image that any individual user will find having high quality can be provided.

According to this modified example, even if a single image is captured by one camera and information about the distance of the subject is obtained by non-camera means (such as a sensor), the processing can also get done in almost the same way as when two cameras are used.

Figure 13:
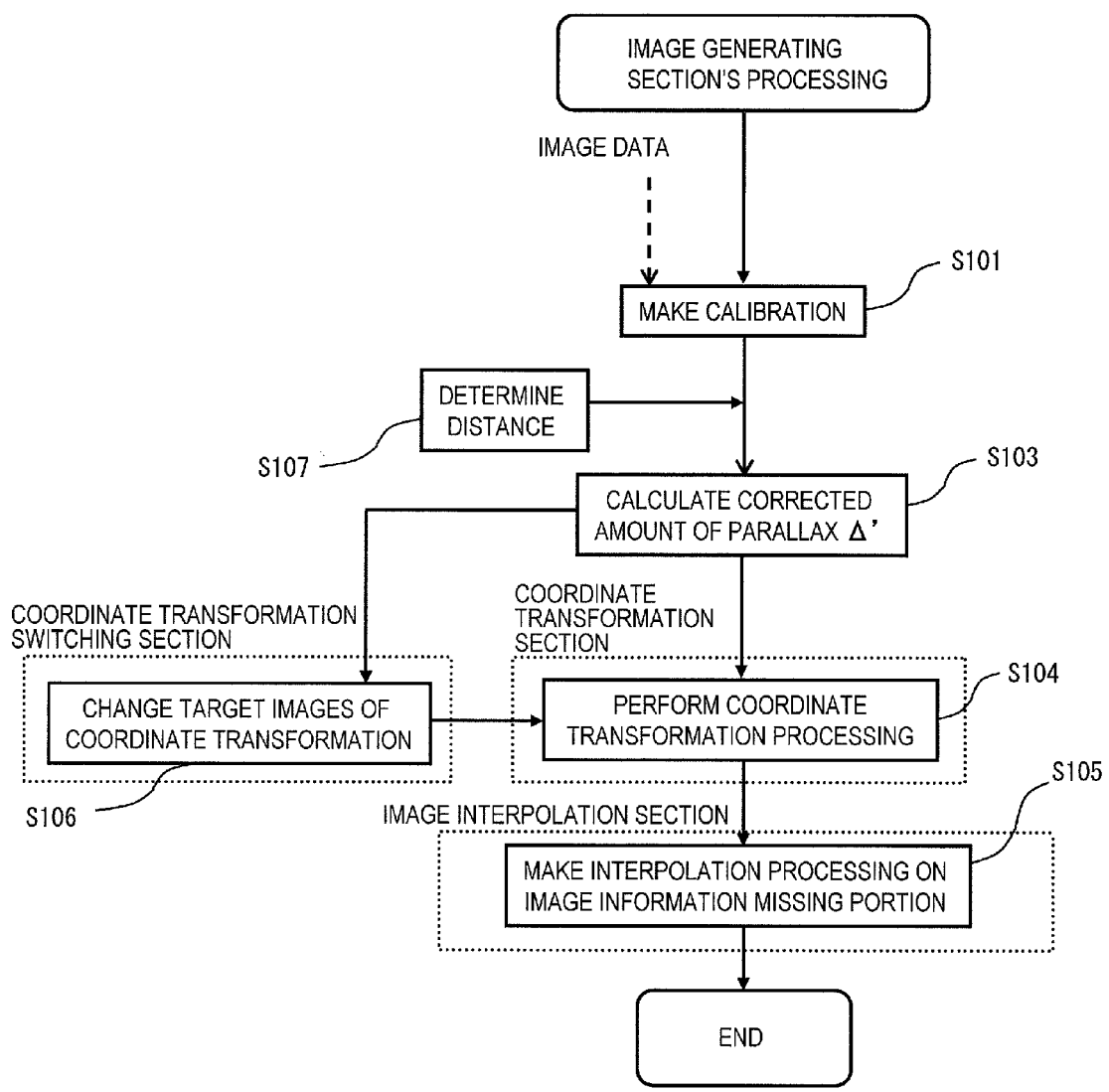
FIG. 13 is a flowchart showing respective processing steps for generating a stereoscopic image on only one image.

FIG. 13 is a flowchart showing respective processing steps for generating a stereoscopic image on only one image. First, in Step S101, calibration processing is performed on a single image that has been captured by one camera. Meanwhile, in Step S107, information about the distance to the subject is obtained by non-camera rangefinder means. Then, in Step S103, the distance information (i.e., the distance Z to the subject), the interval B between the viewer's eyes (i.e., second optical axis interval) and the focal length f are substituted into the following Equation (6):

$$\Delta' = fB/Z \quad (6)$$

In this manner, the corrected amount of parallax $\Delta'$ can be calculated directly.

Thereafter, in Step S104, the amount of parallax $\Delta'$ thus calculated is added to the coordinate values of each unit element of the image in Equation (5). In this case, a coordinate transformed image and a coordinate untransformed image are generated based on that single image. The other processing steps are performed in quite the same way as their counterparts shown in FIG. 2(b), and the description thereof will be omitted herein.

By performing these processing steps, even if only one image has been captured, the same effect can be achieved as in a situation where two images are captured in this modified example. Also, the unnaturalness to be produced due to expansion of such a region associated with the image information missing portion can be reduced by making a coordinate untransformed image incident on the viewer's dominant eye.

The amount of parallax at the interval B between the viewer's eyes does not have to be calculated by Equation (6) but may also be obtained by reference to a database of distance-related information. For example, the positions of the lenses during focusing and the amount of parallax at the interval B between the viewer's eyes to be calculated based on the distance to the subject in focus may be associated with each other and stored in the database.

Furthermore, if a single image is supposed to be captured by one camera in this manner, the coordinate transformation switching section also performs the function of changing the directions in which the amount of parallax is added to the coordinate values of each unit element in that one image.

Embodiment 2

Hereinafter, a second preferred embodiment of a stereoscopic image display device according to the present invention will be described with reference to the accompanying drawings. The following description of the second preferred embodiment will be focused on only differences from the first preferred embodiment described above.

In this second preferred embodiment, the processing step S104 shown in FIG. 2(b) is performed differently from the first preferred embodiment. Specifically, in the processing step S104 of this preferred embodiment, the coordinates of each unit element are transformed and the amount of parallax is corrected in both of the left and right images 50a and 50b so that the amount of parallax between the left and right images 50a and 50b becomes equal to the corrected amount of parallax obtained in the previous processing step S103.

Figure 14:
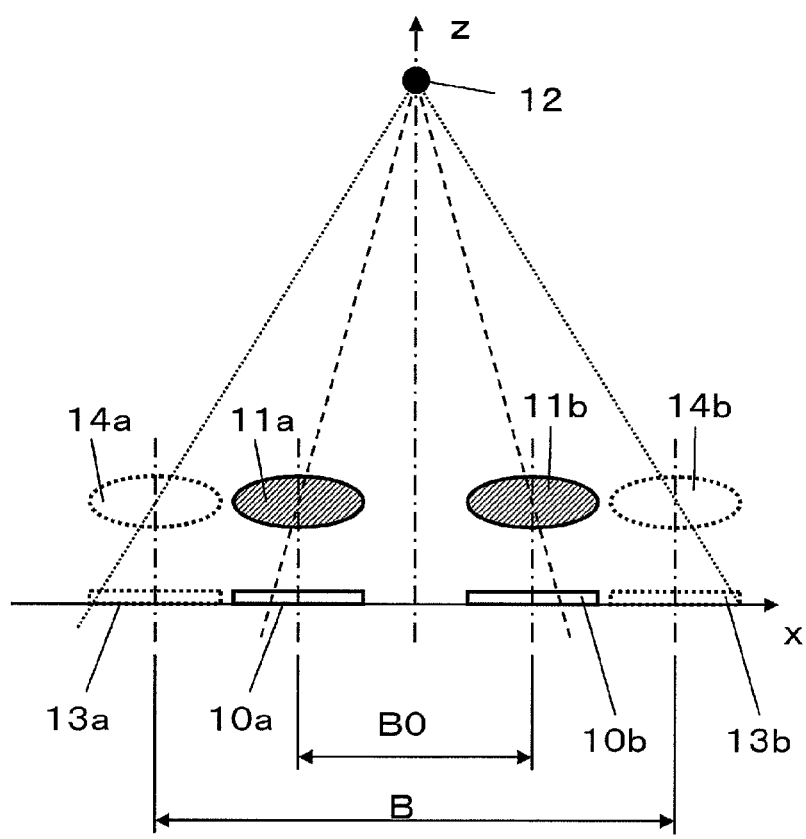
FIG. 14 illustrates the principle of coordinate transformation according to a second preferred embodiment of the present invention.

This processing step will be described in detail with reference to FIG. 14, in which any member also shown in FIG. 3 and having substantially the same function as its counterpart is identified by the same reference numeral and a detailed description thereof will be omitted herein.

In the processing step S104 of this preferred embodiment, the coordinates of each unit element of the left image that has been detected by the image sensor 10a are transformed, thereby reproducing an image to be produced on a virtual image sensor 13a by a virtual optical system 14a. In the same way, the coordinates of each unit element of the right image that has been detected by the image sensor 10b are also transformed, thereby reproducing an image to be produced on a virtual image sensor 13b by a virtual optical system 14b.

Figure 15:
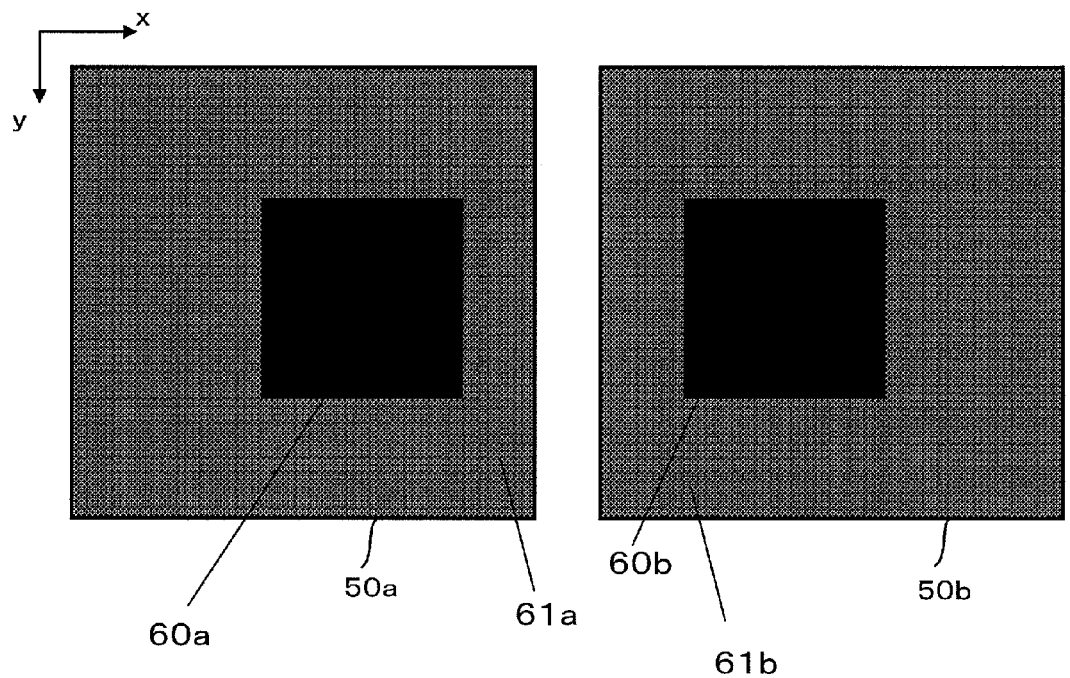
FIG. 15 illustrates images that have been produced on image sensors according to the second preferred embodiment.

Next, the processing step of reconstructing the images to be formed on the virtual image sensors 13a and 13b based on the images that have been produced on the image sensors 10a and 10b will be described with reference to FIG. 15, which illustrates a subject image 60a and a background image 61a that form respective parts of the left image 50a and a subject image 60b and a background image 61b that form respective parts of the right image 50b. It can be seen easily that the subject image is produced at mutually different locations of these two images and that there is a parallax between these two images. In the processing step S104, the coordinate transformation is carried out using the corrected amount of parallax that has been calculated in the previous process step S103, thereby correcting the amount of parallax between these two images. In this manner, the images to be captured by virtual cameras, each of which consists of the virtual image sensor 13a, 13b and virtual optical system 14a, 14b and which are located at an optical axis interval B, are predicted and reproduced.

In this case, the left image 50a already has a parallax, which has been caused through capturing, with respect to the right image 50b. That is why the processing step of adding (corrected amount of parallax Δ'—capturing induced amount of parallax Δ)/2 to the coordinate values of each unit element of the left and right images 50a and 50b in mutually opposite directions is performed.

Specifically, this coordinate transformation is carried out using the following equation (7):

$$\begin{bmatrix} X \\ Y \end{bmatrix} = \begin{bmatrix} x \\ y \end{bmatrix} + \frac{(-1)^i}{2} \begin{bmatrix} \Delta' - \Delta \\ 0 \end{bmatrix} \quad (7)$$

The coordinates of every unit element are transformed by this Equation (7). In this case, the coordinates yet to be transformed are (x, y) but the transformed coordinates are (X, Y). Also, i=1 in the right image but i=2 in the left image. Furthermore, according to the arrangement of this preferred embodiment, the parallax is caused only in the x direction, and therefore, only coordinates in the x direction need to be considered in Equation (7).

Figure 16:
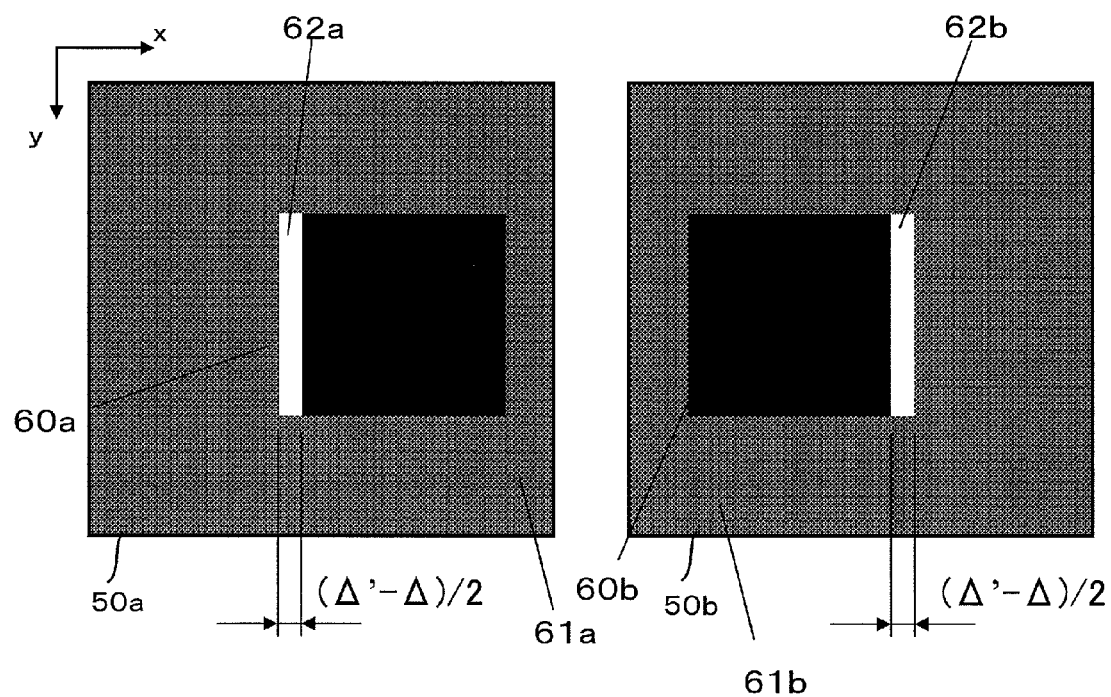
FIG. 16 shows a result of the coordinate transformation according to the second preferred embodiment.

FIG. 16 shows a result of the coordinate transformation. The subject image 60a has been shifted in the +x direction, while the subject image 60b has been shifted in the −x direction.

It should be noted that as a result of the processing steps S102 and S103, every pixel now has capturing induced amount of parallax and corrected amount of parallax values as its information.

By performing this processing step S104, the amount of parallax can be corrected into a value that would be obtained if the images were captured at the interval between the viewer's own eyes. As a result, a stereoscopic image can be displayed without having the viewer find it unnatural.

Also, according to this preferred embodiment, the image information missing portions 62a and 62b of the images to be viewed by the viewer with his or her left and right eyes (i.e., the left and right images 50a and 50b) are produced on mutually opposite sides of the subject image as shown in FIG. 16. That is to say, in a portion of one image where the image information has been lost from the subject image, the image information is present on the other image. And by viewing such left and right images with both eyes at the same time, the viewer can get the image information missing portions of the left and right images 50a and 50b interpolated in his or her brain by the image information of those images and can eventually find the quality of the synthesized image high enough. Such interpolation effect can be achieved even more significantly by making the image interpolation section process those image information missing portions so that such portions are much less noticeable.

Furthermore, according to this preferred embodiment, the coordinate transformation is performed and the amount of parallax is corrected in both of the left- and right images. That is why the area of such an image information missing portion per eye can be reduced, and therefore, the image information missing portions become even less noticeable. As a result, an image of higher quality can be provided.

By achieving these effects, a stereoscopic image of quality can be provided.

Figure 17:
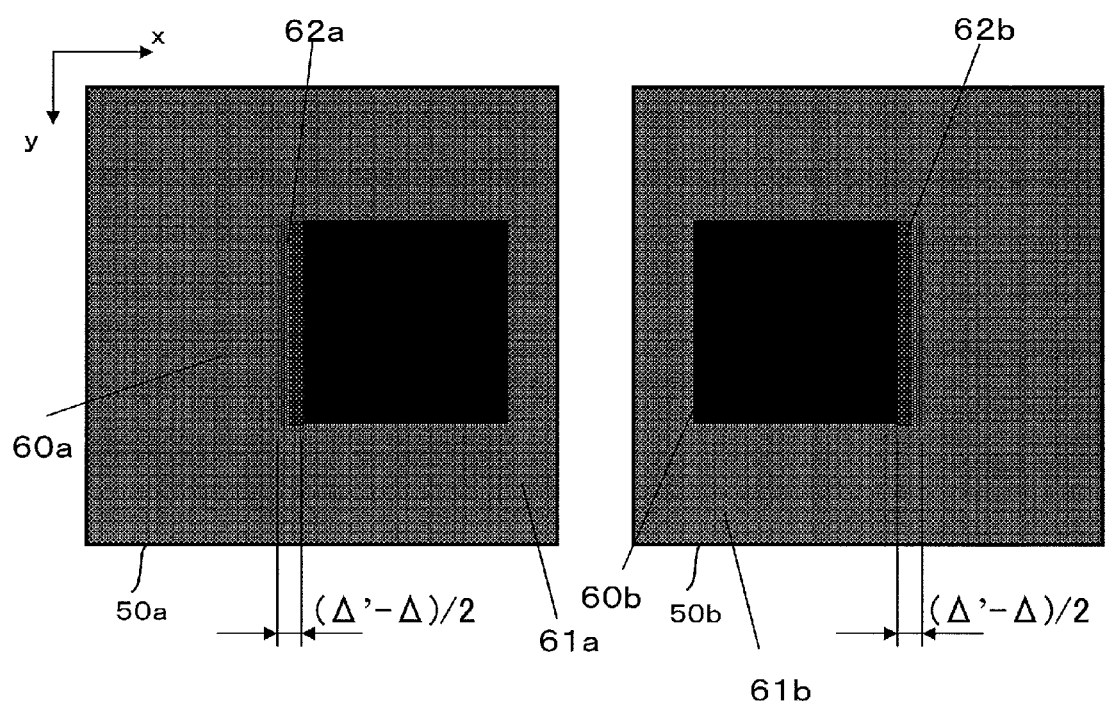
FIG. 17 shows a result of the interpolation that has been made on an image information missing portion according to the first preferred embodiment.

Furthermore, by making interpolation on those image information missing portions that have been produced as a result of the amount of parallax correction as shown in FIG. 17 and as in the first preferred embodiment, the quality of the image sensed by the viewer will not be debased and a stereoscopic image of quality can be provided for him or her.

Optionally, as in the modified example of the first preferred embodiment described above, the coordinates may also be transformed in mutually opposite directions according to this preferred embodiment using only one image. Furthermore, a single-lens image capture device may also be used.

The processing steps for generating an image to be presented on a stereoscopic display may be performed as in the first preferred embodiment described above. In the description of this second preferred embodiment, any component or processing step having substantially the same function as its counterpart of the first preferred embodiment is not described all over again.

INDUSTRIAL APPLICABILITY

A three-dimensional image display device according to the present invention can be used effectively as a device for generating and presenting a three-dimensional image using two images that have been captured by image capture devices, of which the optical axis interval is narrower than the interval between an ordinary person's eyes and which can be built in a cellphone.

REFERENCE SIGNS LIST

1a left camera
1b right camera
2 image input section
3a, 3b, 5 image memory
4 image generating section
6 image output section
7 stereoscopic display
10a left camera's image sensor
10b right camera's image sensor
11a left camera's optical system
11b right camera's optical system
13a left virtual image sensor
13b right virtual image sensor
14a left virtual optical system
14b right virtual optical system
20a viewer's left eye
20b viewer's right eye
21 parallax barrier
22 liquid crystal display
60a subject image in left image 50a
61a background image in left image 50a
60b subject image in right image 50b
61b background image in right image 50b
101 calibration processing section
102 capturing induced amount of parallax extracting section
103 corrected amount of parallax calculating section
104 coordinate transformation section
105 image interpolation section
106 coordinate transformation switching section
109 instructing section

The invention claimed is:

1. A three-dimensional image display device comprising:
an image generating section, which uses first and second images that have been captured by two image capturing sections that are arranged at a first optical axis interval in an x-direction to generate two images to be viewed from two viewing points that are spaced from each other by a wider interval in the x-direction than the first optical axis interval; and
a display section for presenting the two images that have been generated by the image generating section to a user's left and right eyes, respectively, wherein the image generating section includes:
a coordinate transformation section for transforming, on a unit element basis, the coordinates of at least one of the first and second images captured in the x-direction so that the amount of parallax of the two images generated by the image generating section to generate the two images to be viewed from the two viewing points that are spaced from each other by a wider interval than the first optical axis interval becomes equal to the amount of parallax between the two viewing points, wherein the coordinate transformation in at least the x direction is carried out using the equation:

$$\begin{bmatrix} X \\ Y \end{bmatrix} = \begin{bmatrix} x \\ y \end{bmatrix} + \begin{bmatrix} \Delta' - \Delta \\ 0 \end{bmatrix}$$

where (x, y) correspond to the coordinates yet to be transformed, (X, Y) correspond to the transformed coordinates, $\Delta$ corresponds to the amount of parallax of the two images generated by the image generating section, and $\Delta'$ corresponds to the amount of parallax between the two viewing points, wherein the transforming of the coordinates in the x-direction results in an image information missing portion corresponding to information not included in any of the first and second images because the first and second images were generated from viewing points that were located outside of the two viewing points during capturing; and
an image interpolation section for generating, by interpolation, image information for the image information missing portion.

2. The three-dimensional image display device of claim 1, further comprising an instructing section, which is controllable by the user,
wherein in accordance with a signal supplied from the instructing section, the coordinate transformation section outputs a coordinate transformed image, of which the coordinates have been transformed, and a coordinate untransformed image, of which the coordinates have not been transformed yet, to the display section.

3. The three-dimensional image display device of claim 2, wherein the display section presents the coordinate untransformed image to the user's dominant eye.

4. The three-dimensional image display device of claim 2, wherein the coordinate transformation section generates an image by adding a value representing the amount of parallax between the two viewing points to the coordinate values of each said unit element of the first image and then outputs the image thus generated and the first image as the coordinate transformed image and the coordinate untransformed image, respectively.

5. The three-dimensional image display device of claim 2, wherein the coordinate transformation section generates an image by adding a value representing the amount of parallax between the two viewing points and a value representing the difference in amount of parallax between the first and second images to the coordinate values of each said unit element of the first image captured and then outputs the image thus generated and the second image as the coordinate transformed image and the coordinate untransformed image, respectively.

6. The three-dimensional image display device of claim 2, wherein the image generating section further includes a coordinate transformation switching section for changing, in accordance with the signal supplied from the instructing section, the targets of the coordinate transformation of each said unit element from one of the first and second images captured into the other.

7. The three-dimensional image display device of claim 2, wherein the coordinate transformation section is set by default so as to present the coordinate transformed image to the user's left eye.

8. The three-dimensional image display device of claim 1, wherein the coordinate transformation section carries out the transformation by adding, in mutually opposite directions, a value representing a half of the difference between the two viewing points' amount of parallax and the first and second images' amount of parallax to the coordinate values of each said unit element of both of the first and second images captured.

9. The three-dimensional image display device of claim 1, wherein with respect to pixels of the image information missing portion the image interpolation section generates interpolating image information using information of the rest of the image other than those pixels.

10. The three-dimensional image display device of claim 1, wherein the image interpolation section generates the interpolating image information based on information about the intensity of at least one of two pixels that are adjacent to each said pixel that has lost its image information on right- and left-hand sides in a base line direction.

11. The three-dimensional image display device of claim 1, wherein the two viewing points have an interval of 60 mm to 70 mm.

12. An image capture and display apparatus comprising:
the three-dimensional image display device of claim 1; and
two image capturing sections, which are arranged at the first optical axis interval,
wherein the first and second images have been respectively captured by the two image capturing sections.

13. A three-dimensional image display device comprising:
an image generating section, which uses one image that has been captured by an image capturing section and information about the distance to a subject to shoot to generate two images to be viewed from two viewing points that are spaced from each other by a predetermined interval in an x-direction; and
a display section for presenting the two images that have been generated by the image generating section to a user's left and right eyes, respectively,
wherein the image generating section includes:
a coordinate transformation section for carrying out a transformation by adding the amount of parallax between the two viewing points to the coordinate values in the x-direction of each said unit element of the one image captured so that the amount of parallax of the two images generated by the image generating section to generate the two images to be viewed from the two viewing points that are spaced from each other by the predetermined interval in the x-direction becomes equal to the amount of parallax between the two viewing points, wherein the coordinate transformation in at least the x direction is carried out using the equation:

$$\begin{bmatrix} X \\ Y \end{bmatrix} = \begin{bmatrix} x \\ y \end{bmatrix} + \begin{bmatrix} \Delta' - \Delta \\ 0 \end{bmatrix}$$

where (x, y) correspond to the coordinates yet to be transformed, (X, Y) correspond to the transformed coordinates, $\Delta$ corresponds to the amount of parallax of the two images generated by the image generating section, and Δ' corresponds to the amount of parallax between the two viewing points, wherein the transforming of the coordinates in the x-direction results in an image information missing portion corresponding to information not included in any of the first and second images because the first and second images were generated from viewing points that were located outside of the two viewing points during capturing; and an image interpolation section for generating, by interpolation, image information for pixels of the image information missing portion.

14. The three-dimensional image display device of claim 13, wherein the image generating section further includes a coordinate transformation switching section for changing the directions in which the amount of parallax between the two viewing points is added to the coordinate values of each said unit element of the one image captured.

15. The three-dimensional image display device of claim 13, wherein the image generating section further includes an output section for outputting a coordinate transformed image and a coordinate untransformed image to the display section, and wherein the display section presents the coordinate untransformed image to the user's dominant eye.

* * * * *